Patented May 12, 1936

2,040,189

UNITED STATES PATENT OFFICE 2,040,189

WELDING MATERIAL

Jerome Strauss, Pittsburgh, Pa., assignor to Vanadium Corporation of America, Bridgeville, Pa., a corporation of Delaware No Drawing. Application January 4, 1930, Serial No. 418,657

7 Claims. (Cl. 219—8)

This invention relates to welding material, and more particularly to such material in the form of rod, wire, or the like and especially, although not exclusively, to a steel welding material having a high degree of strength combined with toughness.

In welding practices known heretofore, when a metallic weld is made, the composition of the weld is altered from that of the original welding material. The particular object of this invention is to obviate this deficiency in order to insure that the metal as deposited in the weld is not appreciably altered from the initial composition of the welding material, and at the same time to retain to a high degree both strength and toughness in the weld.

It has heretofore been common practice, when welds of high strength combined with a high degree of toughness are desired, to use as a welding rod metal containing appreciable quantities of vanadium. The vanadium imparts to the weld a fine grain structure and high strength combined with toughness. Other elements besides vanadium are also added to further augment the strength without sacrificing the toughness derived from the vanadium. In the use of such welding material in the form of rods, wire, or the like, it has been observed, however that the vanadium content of the deposited metal is, in almost every case, appreciably lower than the vanadium content of the metal from which the weld was formed. As a consequence, it is difficult to predetermine the strength and toughness characteristics of the weld, and to obtain uniform results in respect to physical properties in different welds.

These deficiencies are obviated by my invention. I have discovered that vanadium-containing welding materials may be produced with addition of certain element or elements whereby the content of vanadium and other alloying metals present in the welding material will not be substantially altered during the welding operation. The amount of vanadium and other alloying metals will be practically identical in the weld and in the material from which the weld was made, thus imparting definitely controllable properties to the metal of the weld.

My invention is carried out in the following manner: To the welding material containing vanadium, or vanadium with other alloying element or elements, another element or combination of elements is added, such that the latter will preferentially combine with the gases present either in the atmosphere or from the welding torch. In this manner, the vanadium is protected from oxidizing and combining with the slag fromed during the process of welding. Similarly, other oxidizable elements present are protected in whole or in part. Practically the entire original amount of the vanadium and other element or elements present is thus retained in the weld, and thereby the desired physical properties of strength and toughness are obtained fully in the weld. I use any one of, or combination of the following elements as protective agents: Beryllium, calcium, magnesium, boron, aluminum, silicon, titanium, zirconium, and cerium. These elements are referred to individually or collectively in this specification and in the claims as "vanadium protecting agents". I specifically prefer to use titanium, both on account of its effectiveness and its relatively low cost. These elements are of atomic weight below 141, and are of the second, third, and fourth groups of the periodic system.

As illustrative of the effect of these elements in avoiding loss of vanadium during the welding operation, the following examples are given. In a weld made in steel by the oxyacetylene method using a welding rod containing .090% vanadium and .08% titanium, the weld showed .083% vanadium; in another weld made by the same method with a welding rod containing .160% vanadium and .07% aluminum, the weld contained .142% vanadium; in a third weld made in identical manner with wire containing .180% vanadium, but no protective agent, the resultant weld contained .137% vanadium. It will be observed that the decrease in the vanadium content, as a result of welding, is very much less when a protective element is incorporated into the composition of the welding rod than when such protective element is not present.

While the effectiveness of the presence of protective elements is felt in a wide range of composition, I have found the following preferred compositions to give excellent results:

|  | Per cent |
|---|---|
| Carbon | from 0.05 to 0.40 |
| Manganese | from 0.20 to 3.00 |
| Silicon | from 0.02 to 0.50 |
| Vanadium | from 0.02 to 0.20 |
| Titanium | from 0.04 to 0.20 |
| With or without chromium | from 0.50 to 4.50 | the remainder being in every case principally iron.

An especially desirable composition is:

|  | Per cent |
|---|---|
| Carbon | .10– .25 |
| Silicon | .10– .30 |
| Manganese | .40– .80 |
| Vanadium | .12– .20 |
| Titanium | .08– .20 |
| With or without chromium | from 1.00 to 1.50 | remainder principally iron.

While the details of the invention have been described with especial reference to alloys of iron, its broad principle is applicable to alloys in which the metal present in preponderant amount is other than iron, such as copper, nickel, etc. Furthermore, in iron alloys, other elements may be present in the combination in order to impart specific properties to the metal, such, for instance, as nickel, cobalt, molybdenum, tungsten, etc., without departing from the intent of this invention. It is, furthermore, within the scope of the invention to introduce part or all of either the vanadium or protective agent, or both, in the metallic state or as a metallic alloy, into a coating surrounding the welding wire or rod, or into any material placed in the zone of the weld during the welding operation.

While I have described the present preferred embodiment of the invention, it is to be understood that it may be otherwise embodied within the spirit of the invention and the scope of the appended claims.

I claim:

1. A weld rod containing .05 to .40% carbon, .20 to 3.00% manganese, .02 to .50% silicon, .02 to .20% vanadium, .04 to .20% titanium, the remainder being principally iron.

2. A weld rod containing .05 to .40% carbon, .20 to 3.00% manganese, .02 to .50% silicon, .02 to .20% vanadium, .50 to 4.50% chromium, together with .04 to .20% titanium, the remainder being principally iron.

3. A weld rod containing .05 to .35% carbon, .10 to .30% silicon, .40 to .80% manganese, .12 to .20% vanadium, together with .08% to .20% titanium, the remainder being principally iron.

4. A weld rod containing .05 to .35% carbon, .10 to .30% silicon, .40 to .80% manganese, .50 to 1.50% chromium, .12 to .20% vanadium, together with .08 to .20% titanium, the remainder being principally iron.

5. A weld rod containing from .05 to .25% carbon, from .02 to .20% vanadium, and from .04 to .20% of a vanadium protecting agent of the group comprising beryllium, calcium, magnesium, boron, aluminum, silicon, titanium, zirconium and cerium, which will preferentially combine with the gases present during the process of welding, thereby protecting the vanadium so that the vanadium content of the weld will not be appreciably different from the vanadium content of the original weld rod.

6. A weld rod comprising an alloy of iron containing from .05 to .25% carbon, from .02 to .20% vanadium, and in addition thereto from .04 to .20% of a vanadium protecting agent of the group comprising beryllium, calcium, magnesium, boron, aluminum, silicon, titanium, zirconium and cerium.

7. A welding rod composed of an alloy steel rod containing less than 0.30% carbon, manganese about 0.85%–1.20%, silicon 0.10%–0.45%, and vanadium about .10%–.25%.

JEROME STRAUSS.